May 30, 1950 P. F. M. GLOESS 2,509,226
TELECONTROL SYSTEM
Filed July 1, 1947 2 Sheets-Sheet 1

INVENTOR.
PAUL F. M. GLOESS
BY Robert Harding
ATTORNEY

May 30, 1950 P. F. M. GLOESS 2,509,226
TELECONTROL SYSTEM
Filed July 1, 1947 2 Sheets-Sheet 2
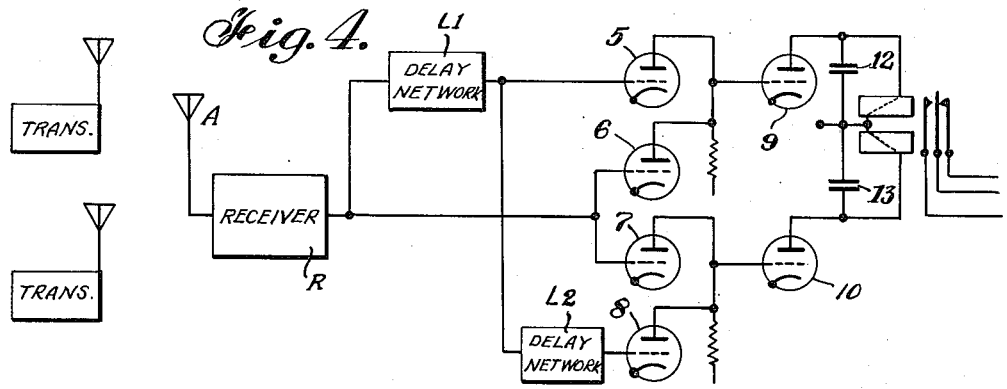
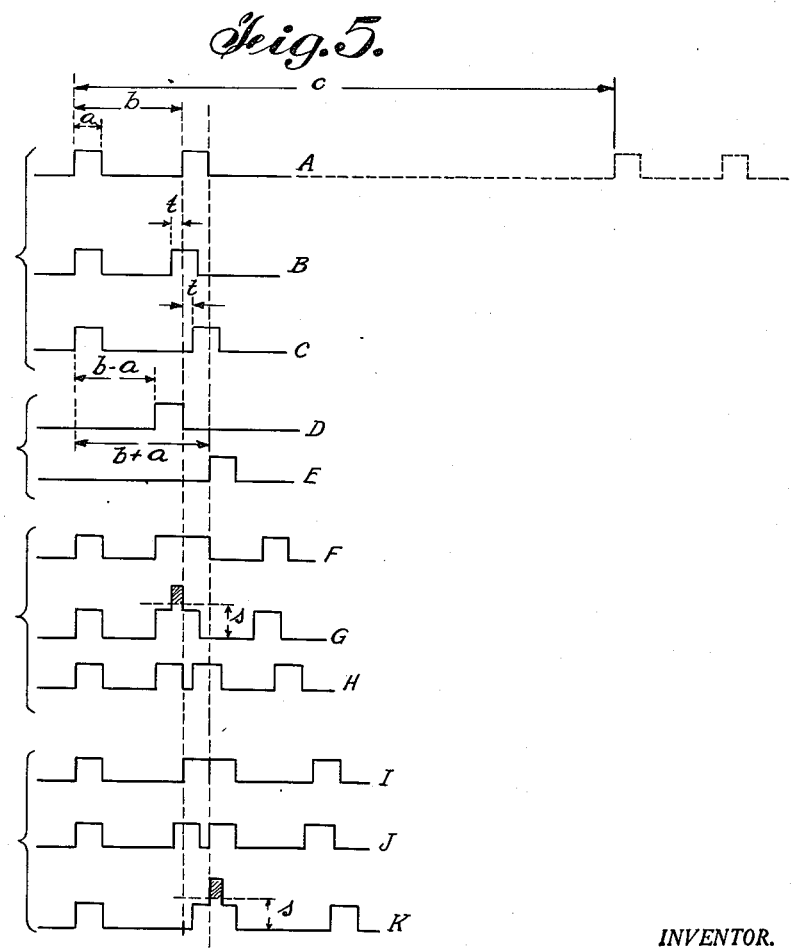
INVENTOR.
PAUL F. M. GLOESS
BY
ATTORNEY

Patented May 30, 1950

2,509,226

UNITED STATES PATENT OFFICE 2,509,226

TELECONTROL SYSTEM

Paul François Marie Gloess, Paris, France, assignor to International Standard Electric Corporation, New York, N. Y., a corporation of Delaware Application July 1, 1947, Serial No. 758,449
In France May 27, 1940

Section 1, Public Law 690, August 8, 1946
Patent expires May 27, 1960.

8 Claims. (Cl. 343—103)

The present invention relates to telecontrol devices and others in which radioelectric pulses are used.

According to certain features of the invention pulses are transmitted at the same rate by two transmitters and used to direct a vehicle such as an airplane. To this effect the pulses received from the transmitters and which have different times of transmission if the vehicle is not in the axis of symmetry of the transmitters, are applied after going through retardation lines to differential devices or the like which operate various controls of the airplane according to its position to the right or left of the axis.

The pulses transmitted by the transmitters may be simultaneous or staggered and the receiving system may comprise one or two separate receivers.

The invention will be described in relation with an embodiment and the accompanying drawings in which:

Figure 4 shows another embodiment in which only one receiver is used;

Figure 5 shows a diagram referring to the embodiment shown in Figure 4;

Figure 1:
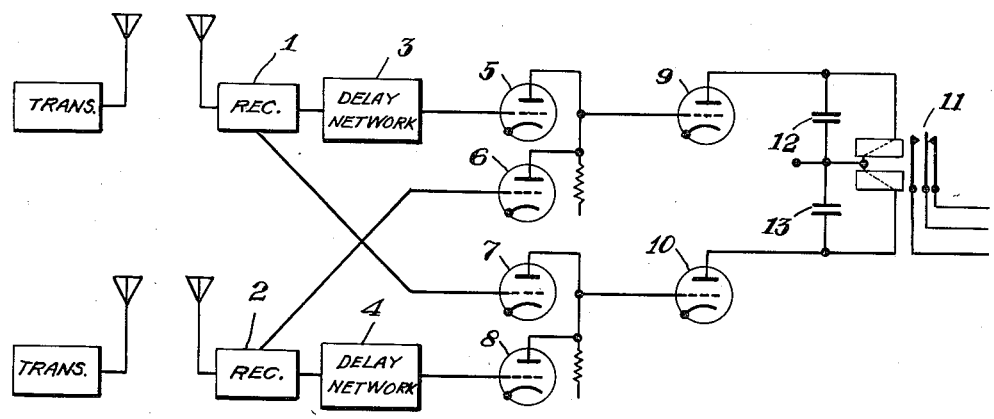
Figure 1 shows an embodiment in which two receivers are used.

Referring to Figure 1, this shows a telecontrol system in which two transmitters, remote from one another, send simultaneously impulses on different wavelengths.

One object of the invention is to determine which of these two impulses, arriving at the receiver through different channels, is leading; and the magnitude of the time difference between these two pulses.

The magnitude of this time difference may be, for example, from $10^{-8}$ to $2.10^{-6}$ second, and the duration of the impulse may be from one-tenth of a microsecond to two microseconds and with a repetition frequency from $10^4$ to $10^5$ per second.

Impulses transmitted on two different wavelengths arrive, after amplification, in two separate receivers 1 and 2.

Figure 2:
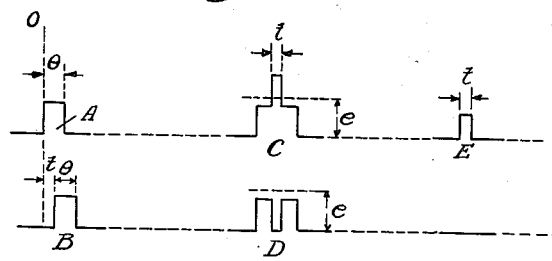
Figures 2 and 3 are diagrams referring to the embodiment shown in Figure 1.

The impulses received by receiver 1 are shown in A on Figure 2, and those received by receiver 2 are shown in B.

These impulses of equal duration $\theta$ are displaced by the time interval $t$ because of the difference in the distances when the airplane is not in the axis of the transmitters. In the example shown, impulse B is lagging with respect to impulse A.

Two retardation lines 3 and 4 are placed in the circuits of receiver 1 and 2 and designed so as to introduce a delay equal to $\theta$.

By means of vacuum tubes 5 and 6 on the one hand, and 7 and 8 on the other hand, the signals so delayed are mixed with signals coming directly from the other receiver. In this way in the output circuit of tubes 5 and 6 and 7 and 8, contains signals shown respectively in C and D on Figure 2.

It may be seen that the superimposition of these impulses gives in the first case a portion of double potential and duration $t$; and in the second case, on the contrary, a portion of same duration but of null potential.

These potentials are applied to tubes 9 and 10 operating as threshold detectors in such a way that only the portion of the signals shown in C and D, Figure 2, are present in the output circuit. The currents from tubes 9 and 10 may be applied to the windings of a differential relay 11. In the example shown, vacuum tube 9 only will let a current pass in the form of an impulse of duration $t$, as shown in E, Figure 2. In this case, relay 11 operates.

In order to facilitate the operation, a limiting device may be provided in the input circuit of the vacuum tubes, or with vacuum tubes 5, 6, and 7, 8 so that the amplitude of the impulse applied to these mixer tubes may be constant, thus enabling an easy discrimination of the useful portion of the resulting impulse C. An automatic polarization device, operated by the mean current of the two tubes 9 and 10, might also be used.

Figure 3:
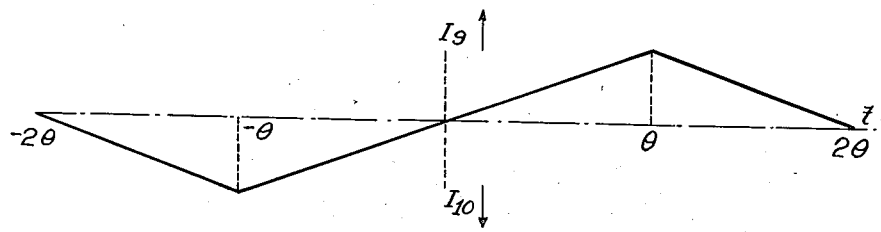

The graph of Figure 3 shows the mean currents of tubes 9 and 10 for positive and negative value of the delay $t$. These graphs show that, for a correct operation of the system, it is necessary to give to the transmitted impulse a duration equal to the maximum length of time to be measured.

The circuits shown on Figure 1 must be considered only as an example of an embodiment of the invention.

It is to be noted in particular that delay circuits 3 and 4, tubes 5, 6, 7, 8, 9, and 10, and relay 11 may, in some cases, be replaced by other elements or apparatus of the same type but of a more complex nature.

In the example shown on Figure 4, two different transmitters, located at a distance one from the other, are sending impulses on the same wavelength.

These impulses are sent with a repetition frequency $c$ and transmitted by the two transmitters, staggered one with regard to the other, in such a way that they arrive on the axis which the vehicle must follow at a predetermined interval of time $b$.

When the vehicle is to the left of this axis, the impulses will, for example, be closer in time relation; when it will be to the right of this axis, the impulses will be farther apart in time relation.

The embodiment shown on Figure 4 comprises a receiver R provided with an antenna A. The output of receiver R is connected on the one hand directly to the clipping and mixing tubes 6 and 7; and on the other hand, through retardation lines L1 and L2 to two other mixing and clipping tubes 5 and 8. The signals arriving on tube 5 will undergo a delay of $(b-a)$, $a$ being the duration of an impulse, the signals applied to tube 8 will undergo delay equal to $b+a$. The impulses received at different points of the circuit are shown on Figure 5. At A are shown the impulses received when the airplane is on the axis. These impulses have a duration $a$ and are spaced in time by an interval $b$. At B and C are shown the impulses received when the airplane is to the left and to the right of the axis, respectively. The impulses shown are those which are directly received and applied to tubes 6 and 7.

At D and E are shown the impulses delayed by retardation lines L1 and L2 of $(b-a)$ and $(b+a)$, respectively, which are applied to tubes 5 and 8.

The output circuits of tubes 5, 6 on the one hand and 7, 8 on the other hand are common and connected to threshold detector tubes 9 and 10, respectively. It is seen that when the vehicle is on the axis, these impulses after uniting follow each other and do not coincide. On the contrary, when the vehicle is, for instance, to the left of the axis, the impulses transmitted to tube 9 will be partially superimposed in amplitude and will, therefore, exceed the threshold level of this tube, a current will therefore appear in the output circuit of this tube. The amplitude of this current is related to the magnitude of the portions of the impulses which coincide and therefore to the magnitude of the distance of the vehicle from the axis. On the other hand, when the vehicle is to the right of the axis, this applies to the impulses on tube 10.

Figure 5 shows at F the signal applied to tube 9 when the vehicle is on the axis; in G when it is to the left, and H when it is to the right thereof.

Due to the threshold levels of tubes 9 and 10, a current flows in tube 10 only when the vehicle is to the left of the axis and the potential applied exceeds the threshold level, as shown in the shaded portion of Figure 5G.

Figure 5 shows also, in I, J, and K, the potentials applied to tube 10. In this case, current flows only in tube 10.

The currents in the output circuits of tubes 9 and 10 are applied to a differential relay 11, provided with two contacts and with filtering condensers 12 and 13.

This relay will close one or the other contact, according to whether the vehicle is to the right or the left of the axis, and this contact may be used to operate the rudder of an airplane or any other device.

In practice, the delays applied to the impulses may be adjusted in a slightly different manner from that which has been schematically shown. For example, the impulses transmitted to tube 5 may have a delay slightly superior to the one which had been contemplated above, while the pulses applied to tube 8 may be slightly less delayed, these two corrections being of the same magnitude. In this way, the output current of tubes 9 and 10 will not be null, even when the vehicle is on the axis.

It will, however, have the same amplitude for both tubes and the differential relay will therefore not operate. On the other hand, as soon as the vehicle will move to one or the other side of the axis, the relay will operate and close the contact corresponding to the duration of the vehicle.

This adjustment has the advantage of giving to the system the same sensitivity with impulses which have not a perfect rectangular shape.

The system disclosed in the invention may be applied to different kinds of telecontrol systems, the operation of the relay may be obtained by staggering the impulses of one transmitter with regard to impulses of the other transmitter, which has the same result as a displacement of a vehicle from the left to the right of the axis.

In this way, telegraphic signals may be transmitted.

The invention may also be used to obtain or maintain the coincidence of two impulses, for example by using in the output circuit an artificial line or retardation line giving to one of the impulses an additional delay sufficient to place it in coincidence with the other impulse. This may be used, for instance, to follow practically in a continuous and automatic manner a vehicle reflecting electromagnetic waves.

While the above is a description of the principles of this invention in connection with specific apparatus, it is to be clearly understood that this description is made only by way of example and not as a limitation on the scope of this invention.

I claim:

1. A telecontrol system, comprising two sources of radio energy impulses situated remote from one another, radio energy impulses receiving means at a given single location, means for delaying said received impulses, means for combining delayed received impulses from one source with the undelayed received impulses from the other source to derive a coincidence of the corresponding impulses from said two sources, the value of the added pulses being dependent upon the difference in time with which said impulses are received, means for obtaining a current from said coincident pulses the direction of which is determined by the value of said added pulses, and differential current responsive means operable in two alternative modes depending on the current flow from said current obtaining means.

2. A telecontrol system, comprising two sources of radio energy impulses having different wavelengths situated remote from one another, two radio energy impulse receivers tuned to said receptive sources and situated at a single location, circuit means for each of said receivers for delaying the received impulses, circuit means for each receiver for mixing the delayed impulses with the undelayed impulses of said other receiver, means for threshold clipping for each receiver, and differential current responsive means operable in two alternative modes depending on the current flow from either of said clipping means.

3. A telecontrol system, comprising two sources of radio energy impulses having the same wavelength situated remote from one another, the impulses of one source being sent with a given time delay with respect to those of the other source, a radio energy impulse receiver timed to said wavelength, means for delaying the received impulses, means for delaying said delayed impulses, means for mixing said received impulses and those delayed in said first named delay means, means for mixing said received and said impulses delayed in said second named delay means, means for threshold clipping the impulses mixed in said first and said second named mixing means respectively, and differential current responsive means operable in two alternative modes depending on the current flow from either of said clipping means.

4. A system according to claim 2, wherein said impulses have a given width and the delaying means is effective in delaying said pulses by said width.

5. A system according to claim 3, wherein the impulses from said sources have a given width and are received at a given rate of occurrence, said first named delay means is effective in delaying the received impulses by a time interval equal to the interval between the received occurring pulses less the pulse width, and said second named delay means is effective in delaying the delayed pulses by an interval equal to the interval between occurring pulses plus the pulse width.

6. An arrangement for indicating coincidence of two separate trains of pulses having a constant pulse recurring rate comprising means for delaying pulses of each train, means for combining the undelayed pulses of each train with the delayed pulses of the other train to derive separate outputs, an indicator, and means for applying said separate outputs differentially to said indicator.

7. An arrangement according to claim 6, wherein said means for delaying delays said pulses an amount substantially equal to the width of the respective pulses.

8. An arrangement according to claim 7, wherein said pulses are of the same constant width.

PAUL FRANÇOIS MARIE GLOESS.

REFERENCES CITED

The following references are of record in the file of this patent:

UNITED STATES PATENTS

| Number | Name | Date |
|---|---|---|
| 1,491,372 | Alexanderson | Apr. 22, 1924 |
| 1,723,907 | Alexanderson | Aug. 6, 1929 |
| 2,247,048 | Bond | June 24, 1941 |
| 2,300,593 | Perroux | Nov. 3, 1942 |
| 2,403,600 | Holmes et al. | July 9, 1946 |
| 2,406,970 | Smith | Sept. 3, 1946 |
| 2,418,284 | Wenchel et al. | Apr. 1, 1947 |
| 2,444,426 | Busignies | July 6, 1948 |
| 2,444,445 | Isbister | July 6, 1948 |
| 2,458,280 | Lindenblad | Jan. 4, 1949 |